Nov. 23, 1943.  R. N. JANEWAY ET AL  2,335,120
JOURNAL HOUSING
Filed June 25, 1942
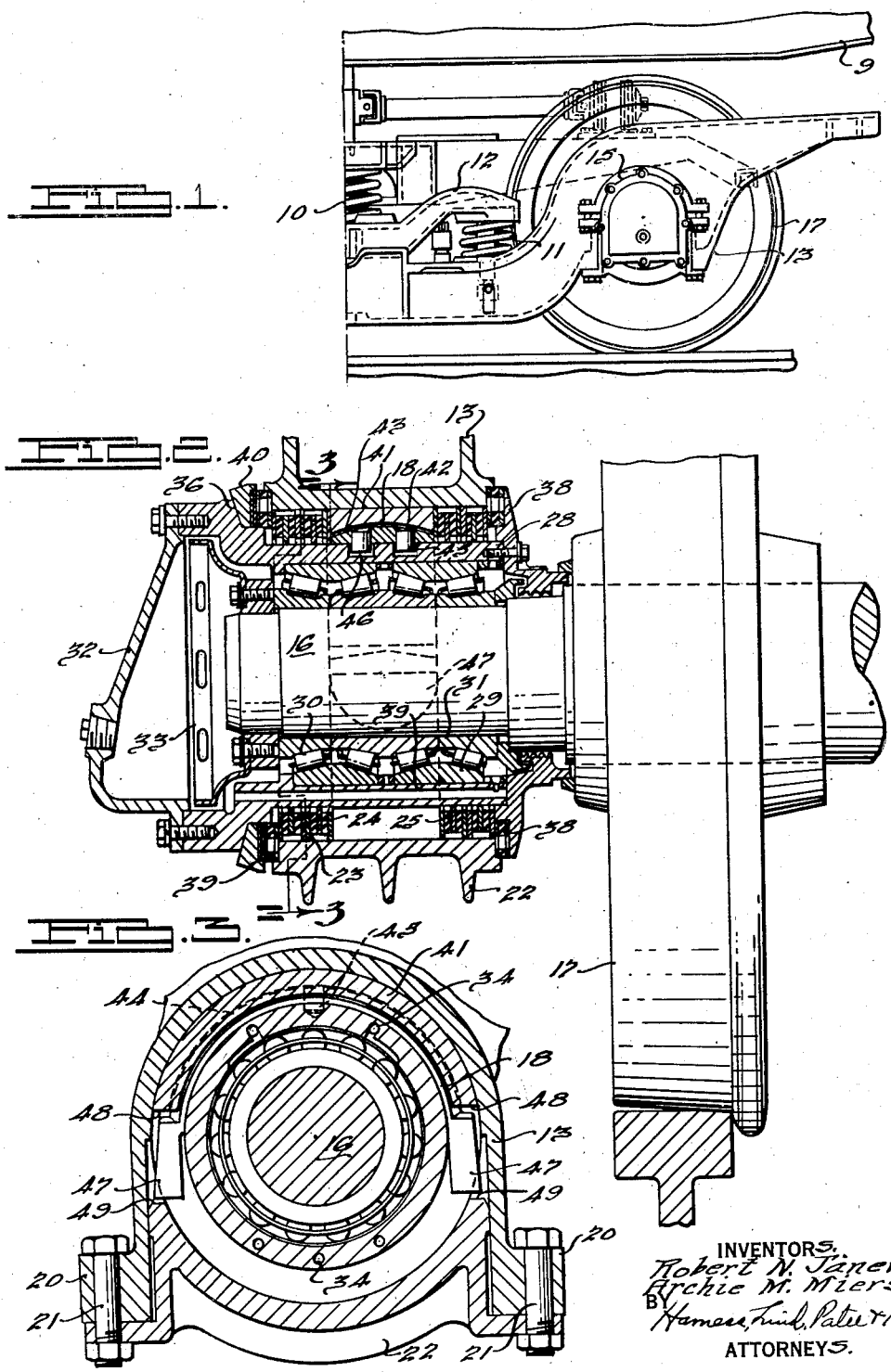
INVENTORS.
Robert N. Janeway,
Archie M. Miers.
BY
ATTORNEYS.

Patented Nov. 23, 1943

2,335,120

UNITED STATES PATENT OFFICE 2,335,120

JOURNAL HOUSING

Robert N. Janeway, Detroit, Mich., and Archie M. Miers, Croton on Hudson, N. Y., assignors to Railroad Rolling Stock Patents Corporation, Highland Park, Mich., a corporation of Delaware Application June 25, 1942, Serial No. 448,350

4 Claims. (Cl. 308—180)

This invention relates to railway vehicle trucks and particularly to the mounting of the journal bearing which mounts the axles in the truck frame.

In Letters Patent No. 2,267,466, granted to Robert N. Janeway on December 23, 1941, a cushioned mounting for the truck axle journal bearing is described and claimed. This mounting includes a plurality of annular rubber elements which act in shear to absorb the shocks and vibrations incident to the running of the truck over the track, and permit a certain degree of universal movement at the connection of the axle and truck frame.

Experience with trucks constructed in accordance with the aforesaid Janeway patent has demonstrated that, for certain types of railway vehicles, too much flexibility between the journal boxes and the frame such as is provided by an all-rubber cushion, is undesirable.

It is accordingly the chief object of the present invention to provide an improved bearing support and journal box construction which gives excellent riding qualities to the railway vehicle, and which provides cushioned equalization and alignment of the truck axles with respect to the connecting frames.

For an understanding of the invention, reference may be had to the accompanying drawing which illustrates a preferred embodiment thereof and in which, Fig. 1 is a side elevation of a portion of a railway truck embodying certain of the features of our invention.

Fig. 2 is a cross-section of the bearing of Fig. 1 taken along the line 2—2 thereof.

Fig. 3 is a section taken along the line 3—3 of Fig. 2.

In the structure illustrated the weight of the railway car body 9 is borne by coil springs 10 which rest on a longitudinally extending intermediate member 12, and by coil springs 11 which are supported on the side frames 13. The intermediate member 12 is freely supported between the springs 10 and 11.

The side frames in turn rest, at each end, on journal bearings 15 which receive the axle journal portions 16. The usual wheels 17 are mounted on the axles intermediate the journal boxes.

Other details of the truck which are not part of the present invention have been omitted. For a fuller description of the truck see the copending application of R. N. Janeway, Serial No. 425,273, filed January 1, 1942.

The side frames 13 are formed at each end with a downwardly open portion which is adapted to embrace the axle as shown. This portion is provided on each side of the axle with ears or lugs 20, adapted to receive bolts 21 by means of which the cap member 22 is adapted to be secured thereto.

Within the annulus formed by the frame portion 13 and the cap 22 is disposed a plurality of end plates 23 and center plates 24 having annular rubber members 25 bonded thereto. Each of the end plates 23 has an outer diameter which is greater than the outer diameter of the central plate 24 and the latter has an inner diameter which is smaller than the inner diameter of the plates 23. The rubber members 25 are bonded to the plates in such manner that the plates are kept out of contact with each other.

The inner periphery of all of the center plates 24 is uniform and is adapted to fit over and retain an annular bearing housing 28, and the end rings 23 are of uniform external diameter so as to closely engage the members 13 and 22 so as to partially support the bearing housing on the members 13 and 22, if desired.

There are two spaced sets of plates as illustrated, the axial space therebetween accommodating a cast spherical bearing member 18 which will be described in detail later on.

Within the housing 28 are disposed annular roller races 29 which are adapted to be engaged by a plurality of tapered rollers 30 which likewise engage inner bearing races 31 secured to the axle for rotation therewith. The housing 28 is closed at its outer end by means of an end plate 32 bolted thereto and normally contains oil for lubricating the bearings, an oil throwing sleeve 33 being provided for throwing oil into the circulating passages 34 (Fig. 3).

The bearing housing 28 is provided at one end, with an annular flange 36, and at the other end with an annular bolted-on flange 37, both flanges being greater in diameter than the inner portions of the support members 11 and 22. Between these flanges and the frame member are disposed spacers 38, each of which comprises a pair of annular metal plates separated by an annular rubber member which is bonded to the plates. Shims 39 are inserted between the outer spacer and a wedge ring 40 which is provided as shown, for keeping the parts in assembled relation. The wedging ring 40 consists of a pair of semi-circular halves bolted together to form an annulus. This ring when pulled into place by its bolts, serves to compress the resilient portions of the spacers 38 and if desired the parts may be adjusted to cause these parts to carry a portion of the vertical load in shear. Ordinarily, however, the spacers 38 as well as the plates 23 and 24 are used as spacers only, the vertical load being supported by the bearing members 18 and 41. When the ring 40 is removed by loosening its bolts, the various parts may be readily adjusted or disassembled.

At the center of the journal bearing assembly the main load is supported by a spherical bearing which comprises castings 18 and 41. The casting 41 fits into the downwardly open frame portion 11 and has an inner arcuate surface 42. The member 18 has an outer arcuate surface 43 which engages the surface 42 of the member 41, a relieved portion being provided as indicated at 44.

The member 18 is carried on the bearing housing 28 as shown, a pair of dowel pins 45 welded to the member 18 and loosely fitting holes 46 in the housing being provided for preventing displacement thereof. The member 18 terminates at each end in lobe portions 47 which are offset slightly and loosely occupy the space between the end surface portions 48 of the member 41 and the shoulders 49 of the cap member 22. The lobe portions serve to locate both the roller bearing housing and the bearing member 41, relative to the side frame.

It will be thus seen that the load on the journal is supported by the spherical bearing which permits limited movement in all directions between the frame and axle end. Because of the frictional contact between the bearing members 18 and 41, this movement is damped but is sufficient to eliminate distortion of the truck frame due to unevenness of the track.

If desired, the plates 23, 24 and the rubber members 25 may be omitted, the spacers 38 having sufficient resilience to urge the parts toward their normal positions and thus keep the truck square.

Although we have illustrated but a single form of the invention, it will be apparent to those skilled in the art that it is not limited to the precise construction shown but that various minor modifications and changes may be effected therein without departing from the spirit of my invention, or from the scope of the appended claims.

We claim:

1. In a railway truck having a frame and an axle, means for mounting the axle in the frame comprising a substantially semi-circular bearing member carried by the frame and having a downwardly presenting concave surface, a substantially semi-circular bearing member carried by the axle and having a convex surface disposed in engagement with said concave surface, said last bearing member having offset portions at each end adapted to extend underneath the end portions of said first bearing member for limiting movement therebetween.

2. A railway axle bearing comprising an axle and a housing concentrically disposed around the axle, roller bearing members interposed between the axle and the housing, a truck frame overhanging the axle and roller bearing members, a pair of relatively movable spherical bearing members positioned between the housing and the frame, said spherical bearing members being centrally located with respect to the roller bearing members, and resilient members interposed between said housing and the frame to provide for limited flexibility of movement of the axle with respect to the frame while the radial compressive load is carried by said roller and spherical bearing members.

3. A railway axle bearing assembly comprising a truck frame having downwardly extending portions formed with an arcuate under surface, a spherical bearing member positioned within the upper portion of said surface, an axle disposed between said downwardly extending portions, a housing surrounding the axle, a roller bearing interposed between the housing and the axle, a second spherical bearing member positioned on the housing and movably engaging the first named spherical bearing member, end portions for said housing extending substantially parallel and in spaced relation to the inner and outer faces of said downwardly extending portions, resilient members positioned between said faces and said end portions, and a cap member secured to the lower ends of the downwardly extending portion and holding said spherical bearing members in position.

4. A railway axle bearing assembly comprising a truck frame having downwardly extending portions, a spherical half bearing positioned between said portions and centrally thereof, a housing within said portions, said housing carrying a complementary spherical bearing engaging said half bearing, said complementary bearing having downwardly extending lobes, said housing projecting beyond the end faces of said frame portions, an axle within the housing, roller bearing members between the axle and housing, resilient members between the projecting portions of the housing and the faces of the frame, and a cap secured to the lower ends of the downwardly extending portions, said cap positioning the spherical bearing through said lobes.

ROBERT N. JANEWAY.
ARCHIE M. MIERS.